:::

United States Patent
Eliasson et al.

(10) Patent No.: US 6,966,144 B2
(45) Date of Patent: Nov. 22, 2005

(54) DEVICE AND USE IN CONNECTION WITH MEASURE FOR COMBATING

(75) Inventors: Bertil Eliasson, Vallda (SE); Per-Åke Hallberg, Sävedalen (SE); Lennart Carlsson, Mölndal (SE); Fredrik Engman, Mölnlycke (SE)

(73) Assignee: CTS Technologies AG, Baar (CH)

( * ) Notice: Subject to any disclaimer, the term of this patent is extended or adjusted under 35 U.S.C. 154(b) by 0 days.

(21) Appl. No.: 10/462,269

(22) Filed: Jun. 16, 2003

(65) Prior Publication Data

US 2003/0213162 A1 Nov. 20, 2003

Related U.S. Application Data

(63) Continuation of application No. PCT/SE01/02804, filed on Dec. 18, 2001.

(30) Foreign Application Priority Data

Dec. 18, 2000 (SE) .............................................. 0004667

(51) Int. Cl.$^7$ ............................................. A01M 17/00
(52) U.S. Cl. ..................................................... 43/132.1
(58) Field of Search ............................... 43/132.1, 124; 451/39, 102, 53, 99; 239/2.2, 14.2; 134/7; 62/603, 602

(56) References Cited

U.S. PATENT DOCUMENTS

| | | | | |
|---|---|---|---|---|
| 2,179,665 A | * | 11/1939 | Martinet ........................ | 43/124 |
| 3,969,908 A | * | 7/1976 | Lawless et al. ............. | 239/14.2 |
| 4,160,336 A | * | 7/1979 | Query et al. ................ | 43/132.1 |
| 4,200,656 A | * | 4/1980 | Cohen et al. ................ | 426/331 |
| 4,413,756 A | | 11/1983 | Kirley ......................... | 43/132.1 |
| 4,597,217 A | * | 7/1986 | Narita .......................... | 43/124 |
| 4,624,070 A | * | 11/1986 | Query et al. ................ | 43/132.1 |
| 4,833,818 A | * | 5/1989 | Berta ........................... | 43/132.1 |
| 4,834,967 A | * | 5/1989 | Lociero ........................ | 424/45 |
| 5,027,546 A | | 7/1991 | Tallon .......................... | 43/124 |
| 5,063,706 A | * | 11/1991 | Aki et al. ..................... | 43/124 |
| 5,125,979 A | | 6/1992 | Swain et al. ................. | 134/7 |
| 5,165,199 A | | 11/1992 | Tallon .......................... | 43/124 |
| 5,179,840 A | * | 1/1993 | Worsfold ..................... | 43/124 |
| 5,349,778 A | * | 9/1994 | Chu ............................ | 43/132.1 |
| 5,390,450 A | * | 2/1995 | Goenka ....................... | 451/39 |
| 5,394,643 A | | 3/1995 | Schmittmann ............... | 43/124 |
| 5,405,283 A | * | 4/1995 | Goenka ....................... | 451/39 |
| 5,409,418 A | * | 4/1995 | Krone-Schmidt et al. ..... | 451/39 |
| 5,419,077 A | * | 5/1995 | Tombarelli ................. | 43/132.1 |
| 5,514,024 A | * | 5/1996 | Goenka ....................... | 451/39 |
| 5,616,067 A | * | 4/1997 | Goenka ....................... | 451/39 |

(Continued)

FOREIGN PATENT DOCUMENTS

| | | | |
|---|---|---|---|
| EP | 320012 B1 | * | 6/1989 |
| EP | 633423 B1 | * | 1/1995 |
| EP | 0 823 214 A2 | | 2/1998 |
| SE | 515027 C | | 5/2001 |
| WO | WO 00/64287 A1 | | 11/2000 |

*Primary Examiner*—Darren W. Ark
(74) *Attorney, Agent, or Firm*—Alfred J. Mangels (57) ABSTRACT

Apparatus and a method for controlling vermin either directly or indirectly via objects giving shelter to the vermin. Cooling of the vermin is effected by providing dry snow particles by passing pressurized carbon dioxide through a nozzle directed at the vermin. Smaller and larger snow particle sizes are allocated within a selected range of sizes and velocities. Environmentally friendly and rapid control of the vermin is achieved, and an effectively functioning cooling system is provided, which, by the gradual supply of snow, executes cooling through different velocities and sizes of the snow particles. In a initial cooling phase small snow particles provide cooling by sublimating and giving off cold rapidly. Larger snow particles then penetrate through the gas barrier that is created by the sublimating small snow particles to maintain the cooling effect.

22 Claims, 3 Drawing Sheets

U.S. PATENT DOCUMENTS

| | | | | |
|---|---|---|---|---|
| 5,678,352 A | * | 10/1997 | Leitner et al. | 43/124 |
| 5,679,062 A | * | 10/1997 | Goenka | 451/102 |
| 5,765,578 A | * | 6/1998 | Brandt et al. | 134/7 |
| 5,768,907 A | * | 6/1998 | Lee | 43/132.1 |
| 5,775,127 A | * | 7/1998 | Zito | 62/603 |
| 5,846,338 A | * | 12/1998 | Bonora et al. | 451/39 |
| 5,853,128 A | * | 12/1998 | Bowen et al. | 451/39 |
| 5,931,721 A | * | 8/1999 | Rose et al. | 451/89 |
| 5,961,732 A | * | 10/1999 | Patrin et al. | 451/39 |
| 6,151,913 A | * | 11/2000 | Lewis et al. | 62/603 |
| 6,491,231 B1 | | 12/2002 | Eliasson et al. | 239/1 |
| 6,572,457 B2 | * | 6/2003 | DePalma et al. | 451/39 |
| 6,604,318 B1 | * | 8/2003 | Cassidy | 43/132.1 |
| 2002/0078621 A1 | * | 6/2002 | Jones | 43/124 |
| 2003/0188766 A1 | * | 10/2003 | Banerjee et al. | 134/7 |

* cited by examiner

DEVICE AND USE IN CONNECTION WITH MEASURE FOR COMBATING

CROSS-REFERENCE TO RELATED APPLICATION

The present application is a continuation of copending International Application No. PCT/SE01/02804, filed Dec. 18, 2001, the entire contents of which are hereby incorporated herein by reference.

BACKGROUND OF THE INVENTION

1. Field of the Invention

The present invention relates to an arrangement for producing a cooling function, essentially for the purpose of controlling pests or insects in or on a target or a target surface. More particularly, the present invention relates to an activatable unit on the one hand, with a nozzle arrangement having one or more nozzles that include one or more discharge orifices so arranged as to be capable of being directed towards the target or the target surface at a predetermined distance, and on the other hand to a source of carbon dioxide or some other environmentally friendly substance, connected or capable of being connected to the nozzle arrangement via one or more connections, for the generation of snow particles.

Among other aspects, the arrangement in question is an arrangement for executing control measures against vermin, either directly or indirectly, in or on objects giving shelter to the vermin (substrates or similar) or in or on substances (e.g., flour or similar). The expression "vermin" denotes different forms of pests and their different life cycles (eggs, larvae, etc.). Insects, maggots, bacteria, wood lice, mites, etc., can be mentioned by way of example.

The invention also pertains to an application of snow particles generated in the unit, for example dry snow particles, which exit from the unit in larger and smaller sizes selected within a predetermined range of sizes and emerge at different velocities which lie within a predetermined range of speeds.

2. Description of the Related Art

Previously disclosed in various contexts is the control of vermin in the form of such insects, invertebrates, bacteria, etc., by the application of a snow-generating arrangement and methods, with the help of which the vermin in question to be controlled are attacked. Reference can be made inter alia to PCT Publication No. WO 00/02446 A1, which is based on Swedish Patent Application 9803530-6. That application proposes, among other things, a nozzle arrangement and a method for the production of snow for the purpose of environmentally friendly insect control. The inventors in that application are also the inventors in the present patent application.

Also previously disclosed, for example through U.S. Pat. No. 5,394,643 A, is the utilization of snow-generating functions in which snow application is intended to cause slow degassing in order to asphyxiate the vermin, insects, etc., in question with the generated gas.

Also previously disclosed are a number of different, alternative gas-generating decontaminating devices, which utilize carbon dioxide in conjunction with pest control, and reference can be made here to U.S. Pat. No. 4,413,756 A and U.S. Pat. No. 5,165,199 A.

Also previously disclosed, see for example U.S. Pat. No. 5,027,546 A, is a proposal for control measures based on control by means of freezing or cooling of the objects to be controlled.

The design of snow-generating equipment is also previously disclosed in itself, and reference may be made in this context to U.S. Pat. No. 5,125,979 A, which relates to snow particle-generating equipment having nozzle and discharge functions which give different sizes of snow particles and associated snow particle velocities, which are adapted in the first instance for cleaning purposes.

SUMMARY OF THE INVENTION

The present invention is aimed at ensuring that the control measure in question is capable of execution by cooling the pests, insects, invertebrates, etc., in question, and/or objects, substrates or surfaces in association with which the pests or equivalent are present.

In conjunction with this, it is appropriate for cooling to be capable of being executed effectively with optimally short processing times, and preferably with the least possible consumption of materials which give rise to snow formation. The equipment in question must also be capable of being used in a natural fashion which is not physically demanding. Control must be capable of being performed primarily free from toxicity and without impairing (at least temporarily) the surrounding atmosphere. Control must be effective and must not be based in any respect on the generation of gas which may be expected to permeate down into cracks and constricted spaces. It has been found that the insects or equivalent cannot be reached with a sufficient quantity of gas for a sufficiently long period. There is thus a pressing need to be able to perform effective control in cases which have proved difficult to control, and in cases where control has not been successful with previously described equipment. There is also a wish, in more normal cases, to be able to reduce the control periods, for example by 50%, in spite of the need to achieve complete killing. An object of the invention is also to solve that problem.

In conjunction with the invention, it is desirable to obtain optimized rapid cooling based on the need to produce one or more layers formed from small particles on an actual surface, on vermin/accumulations of vermin, substrates, substances, etc. It is important in this respect for the layer(s) to be capable of sublimating as close as possible to the surface in question, at or on the surface itself, which must accordingly be covered with rapidly sublimating particles. The invention also solves that problem.

The different types of vermin and the location(s) of the vermin in conjunction with control impose requirements for considerable adaptability of the control equipment.

It is important to be able to access the primary targets in the form of the vermin, insects, etc., even if they are not exposed to direct hits. In accordance with the invention, the primary targets must be accessible for rapid cooling via and/or through heat-conducting materials (e.g., metal, alloys, etc.) and/or air. It is important in conjunction with this that undesired snow accumulation does not occur so that the effect of the cooling sequence is reduced before the intended final cooling has been accomplished. The invention also solves that problem.

Previously disclosed is the process of making snow by allowing gas to expand in a suitable nozzle. In conjunction with this it has been found that the cooling capacity of carbon dioxide snow varies considerably with both velocity and particle size. The method of producing snow with snow nozzles in accordance with previously disclosed technology is associated with shortcomings, which means that the previously disclosed arrangements and methods are not suitable for insect decontamination, for example. Although a certain degree of distribution is achieved in respect of different particle sizes from one and the same nozzle, the previously disclosed arrangements and methods are not suitable for use in the context indicated here because the velocities of the snow particles were selected with incorrect values. The invention also proposes to solve that problem.

It is also important to counteract the generation of heat after the heat response that is generated by the vermin/accumulation of vermin after a certain cooling/rate of cooling. The generation of heat counteracts cooling and continues for a predetermined period. The invention also solves problems which can arise in conjunction therewith.

What may primarily be regarded as characteristic of the invention is, among other things, that the nozzle arrangement and the supply, respectively, of the carbon dioxide and the environmentally friendly substance, are arranged and selected to generate snow particles with different discharge sizes and discharge velocities. The invention is also characterized in that the nozzle arrangement and the supply, respectively, of the carbon dioxide and the environmentally friendly substance are so arranged and selected, at the predetermined distance, as to generate smaller snow particles occurring close to the target with velocities within a selected velocity range, which smaller snow particles, in an initial phase of the rapid cooling function, perform the principal cooling effect by a process of sublimation near or on the target or the target surface. Finally, the invention is characterized in that the nozzle arrangement and the supply, respectively, of the carbon dioxide and the environmentally friendly substance are also so arranged and selected, at the predetermined distance, as to generate larger snow particles close to the target, which, in a subsequent phase following the initial phase, execute the principal cooling effect by passing through a gas barrier formed at the end of the initial phase, and by penetrating in towards the target and the target surface with the help of their masses and existing velocities.

An arrangement for vermin control, for example pest or insect control, with a unit for generating snow particles, can be regarded as being characterized primarily in that the unit generates dry snow particles of smaller and larger sizes situated within a predetermined size range, and emerging via a respective discharge orifice or nozzle in the unit at discharge velocities selected in accordance with the construction or setting of the respective nozzle and/or discharge orifice. The unit with its associated nozzle or nozzles, and/or discharge orifice or discharge orifices, is so arranged, at a selected range of distances between the respective nozzle and/or discharge orifice and the target or the target surface, as to cause a cooling function in two phases. In the first phase the small particles strike the target or the target surface at velocities within a selected range of velocities; in the second phase the larger particles pass through a gas barrier generated in the first phase by the small particles and penetrate in towards the target and the target surface, in conjunction with which a principal cooling rate is brought about by the small particles executing the principal cooling effect in the first phase, and by the large particles executing the principal cooling effect in the second phase.

An arrangement for executing control measures against vermin, either directly or indirectly, in or on objects giving shelter to the pests may be regarded as being characterized primarily in that the control measure is based essentially on a principal or predominant cooling rate of the vermin, the object, and the substances with the help of dry snow particles to which smaller and larger sizes are attributed within a selected range of sizes, and velocities within a selected range of velocities.

Embodiments of the arrangement referred to in the foregoing can consist of the different velocities being related to selected velocities of the pest, the object, and the substance, which latter velocities are capable of being determined in this case with the help of the discharge velocities from one or more nozzles or discharge orifices for the dry snow particles. The selected velocities are also selected with reference to the distance between the respective nozzle and/or discharge orifice. The snow particles (dry snow particles) generated in the unit are formed from or consist of carbon dioxide snow. The different sizes and velocities of the dry snow particles are selected, principally in conjunction with direct hits on the actual vermin, as to bring about a cooling rate within a range of 3–30° C./s, essentially with a value or values within the range of 10–25° C./s, and with particular advantage in the range of 15–20° C./s. As far as the sizes of the dry snow particles are concerned, these relate to sizes which occur within the range of 0–5 cm from the surface in question or its equivalent that is being controlled.

Utilized in a preferred illustrative embodiment is a third phase, which is essentially selected to exceed the duration of a heat response on the part of the vermin. The period of time in this case is selected so that the cooling temperature remains effective until such time as the heat response begins to subside.

In one embodiment, the different sizes and/or discharge velocities of the dry snow particles for the nozzles and/or discharge orifice in question are selectable by means of one or more forms of the components which determine the shape of the flow channel or flow channels in the unit, its nozzle(s) and/or discharge orifice(s), and/or operating parameter(s), e.g., quantity, velocity, choke functions, etc., in the carbon dioxide supply. In those embodiments, there is also a requirement, in the course of the cooling sequence, for the greatest possible mass of dry snow to sublimate extremely rapidly on or in the vicinity of the vermin, the object, the surface of the object, and/or the substance, etc., which gives shelter to the vermin. The target or the target surface must be exposed rapidly to fully or partially rapidly sublimating particles. The energy required for the sublimation process is capable of being transferred from the vermin, the object, the surface of the object, and/or the substance, which in this way is/are subjected to the desired rapid cooling. An accelerated cooling process is achieved in the event of collisions between the dry snow particles and the vermin, the object, the surface of the object, etc.

One application for dry snow particles generated in the unit, which are discharged from the unit in smaller and larger sizes selected within a predetermined range of sizes, and with different velocities which lie within a predetermined velocity range, is characterized in that the dry snow particles are used to cause a rapid cooling effect, which essentially executes the control measure unassisted, in a control measure against vermin, insects, etc., or objects or substances giving shelter thereto.

In a further development of the application, the smaller dry snow particles are used to bring about a first phase in the cooling process, and the larger dry snow particles are used to bring about a second phase in the cooling process following the first phase. A third phase can be utilized as a temperature maintenance phase, by means of which an extremely good control result, for example 100%, can be achieved.

A series of benefits is obtained from what is proposed in the foregoing. A completely toxicity-free control function can be established. The equipment concerned can consist, at least to a large part, of previously disclosed equipment which represents tried and tested technology in this context. The equipment for generating snow particles can in principle comprise one or more nozzle arrangements and assemblies, or tubes capable of attachment thereto, for the supply of carbon dioxide or some other environmentally friendly substance which is utilized as a gas for snow generation. The nozzles, discharge orifices, etc., in question can have different variations in length, diameter, geometry, material, etc., attributed to them. A working distance between the nozzle and the controlled target or its surface can lie within the range of distances that is well proven in practice, e.g., at a distance of 5–50 cm. Pulsed flows for the dry snow particles can be used, and the right particle sizes and velocities and mass flows can be used to optimize the equipment in the context of different applications. The balance between sublimation and the sizes and velocities of the particles can thus be maintained in the different contexts. The arrangement and the application in question are particularly advantageous in conjunction with controlling vermin, insects, etc., but it is also entirely possible to envisage their suitability for use in other applications.

The invention also makes it possible to start the cooling sequence with small particles which have a favorable relationship between mass and surface area. When the small particles reach the surface, they sublimate rapidly, and energy for the sublimation process is supplied by the object or the target surface, the temperature of which falls as a result. A layer of cold carbon dioxide can thus be formed above or in conjunction with the surface with a direction of flow outwards from the surface. The larger the quantity of solid carbon dioxide ($CO_2$) that sublimates, the more pronounced the layer of cold carbon dioxide gas becomes. If only small particles are supplied by the unit, these particles will soon be slowed down by a forming gas layer and will sublimate further away from the surface. They will then not contribute to the continued cooling of the surface in a significant fashion, and they will sublimate in the gas which is moving away from the surface. In this way the small particles will move rapidly relative to this gas, which increases the rate of sublimation compared with transport as far as the target surface, when gas and particles are moving in the same direction. In the resulting situation, the larger particles, with a greater mass in relation to the surface area, will find it easier to reach the target surface and sublimate on it.

Once the surface has cooled, the gas layer above the surface will reduce in thickness and an increasing number of particles will then reach the surface. Particles can be bound to it in this way and can maintain the resulting lowest or low temperature until the desired result has been achieved. Situations which could not previously be controlled at all can now be controlled by means of the invention with excellent or 100% results. The control periods can be reduced to 50% in certain cases, which means reduced gas consumption and lower costs. Among other things, there is no longer a need to subject the environment surrounding the vermin and the object to such strong cooling.

BRIEF DESCRIPTION OF THE DRAWINGS

A proposed illustrative embodiment of an arrangement and an application which exhibit the significant characteristics of the invention will be described below with simultaneous reference to the accompanying drawings, in which.

DESCRIPTION OF THE PREFERRED EMBODIMENTS

Figure 1:
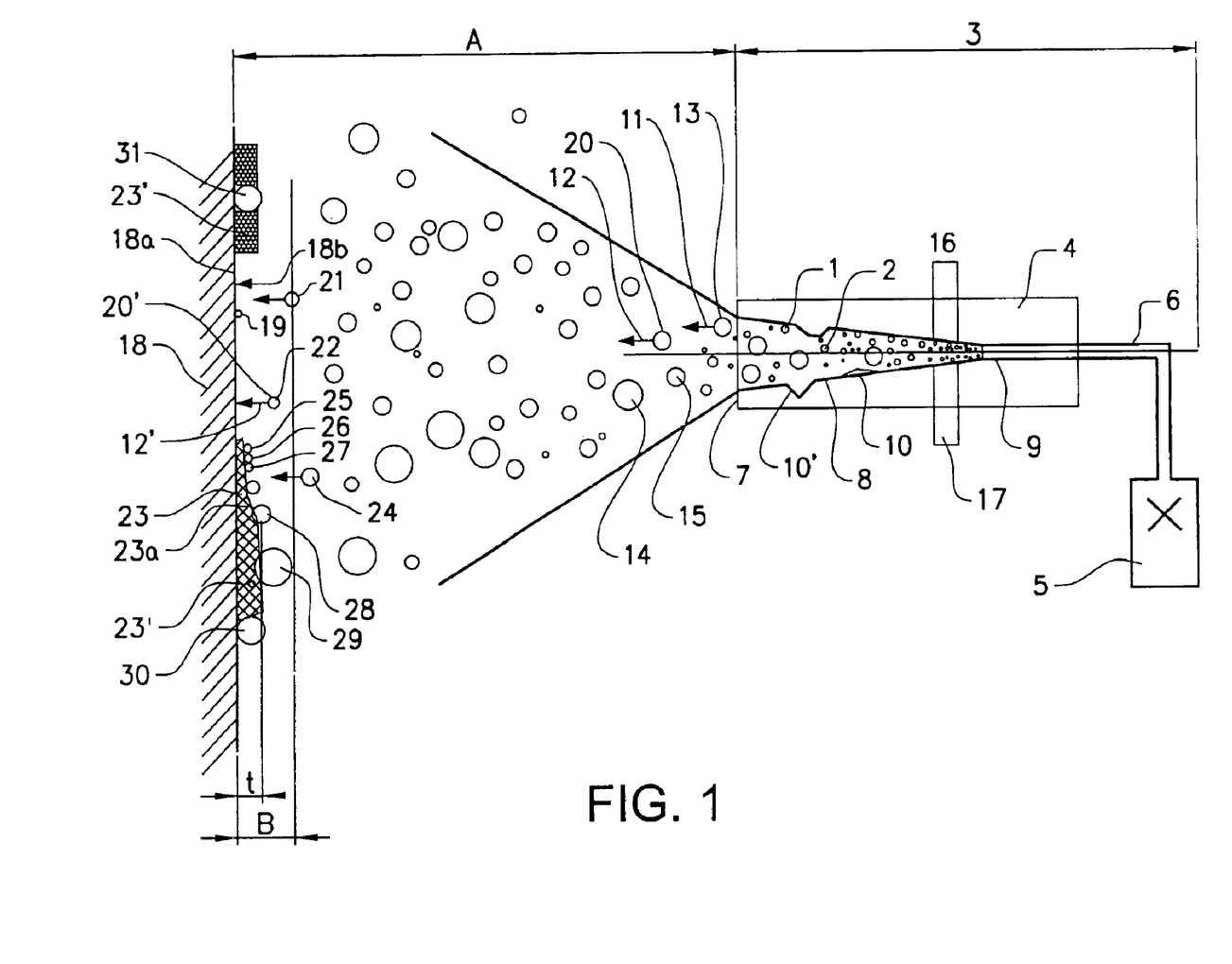
FIG. 1 illustrates in diagrammatic form a side view of a unit for the generation of dry snow particles, from which unit dry snow particles are discharged in different sizes and at different velocities in a direction towards a target surface, in conjunction with which the principal structure of different layers on the surface is indicated.

In FIG. 1 a unit or assembly for generating dry snow particles 1, 2 is designated as 3. The unit comprises a nozzle part 4 and a source 5 of carbon dioxide. The source is attached in a previously disclosed fashion to the nozzle via one or more conduits 6. The snowmaking function is previously disclosed and as such does not require more detailed description here. It need only be stated that the nozzle operates with an agglomeration function, which means that dry snow particles leave the outlet 7 of the nozzle 4 in different sizes (particle sizes) and at velocities selected with the help of the design of the nozzle and the supply of gas from the gas source. The particles, which are small at the end 9 of the injection tube 6, i.e., they exhibit small particle size, agglomerate in the channel 8 of the nozzle. In the channel, it is possible to arrange brushes 10, or obstacles and/or recesses 10', which cause changes in the geometry and amplify the air turbulence in the channel, which means that the particles can increase in size as they move out towards the outlet 7 of the nozzle. Particle sizes and, if necessary, particle velocities, can also be selected or may be dependent on the electrical charge, e.g., static or applied electricity.

In FIG. 1 arrows 11 and 12 are used to symbolize different discharge velocities for two particles, which different discharge velocities can thus be selected with the help of the gas supply. Characteristic of the nozzle design is thus that the particles have different sizes as they emerge from the nozzle, and three particles 13, 14, and 15 are accordingly illustrated with different sizes. It must be noted at this point that the Figure is not to scale, but that the differences in the particle sizes are illustrated with distinctly different relative sizes in the interests of clarity. Actuating devices, e.g., push-buttons 16, 17, are also indicated in principle on the nozzle 4 in FIG. 1. Upon actuation of these actuating devices, the agglomeration and velocity functions and, if appropriate, the electrical charge, can be varied so that the sizes and the velocities 11, 12, of the dry snow particles 13, 14, 15, can be selected depending on the object to be controlled and the effect to be achieved thereby.

In conjunction with the application of the unit or assembly 3, the outlet 7 of the nozzle is aimed at a target 18. In the illustrative embodiment the nozzle is aimed in a more concrete fashion at the surface 18a of the target. The target can be in the form of a substrate, object, etc., where vermin 19 or accumulations of vermin are present. The distance between the outlet 7 of the nozzle and the target surface 18a is designated as A. In an illustrative embodiment of the invention, this distance A is selected within the range of 5–50 cm. It is known that the dry snow particles are capable of changing in size through the agglomeration function as they travel towards the target surface 18a. Also previously disclosed is the reduction in the velocities 11, 12 as the particles travel towards the target surface 18a. FIG. 1 shows how a particle 20 with a velocity 12 has reduced its velocity to 12' when the particle assumes the position 20'.

In accordance with the invention, control of the target must take place with particle sizes and particle velocities that are defined at or within a distance B, which distance can vary from 0–5 cm. The sizes of the particles at or within that distance are thus dependent on the attained agglomeration function and/or on the sublimation function described below. The velocity at or within the area B is dependent on the distance A and the discharge velocities 11, 12. The control function can thus be varied depending on the discharge velocities and the distance A.

FIG. 1 also illustrates layer structures of sublimated dry snow particles. A part of the surface 18b is thus shown at the start of a cooling sequence where small particles 21 and 22 are able to strike the surface directly and to sublimate immediately on it. The designation 23 shows a layer structure or gas barrier structure where the sublimation that has started directly against the surface has continued for a certain period so that a layer or barrier 23 has begun to be formed. Small particles 24, 25, 26, 27 are able to strike the upper surface 23a of the layer causing further buildup of the layer. After a time, the layer or barrier assumes a thickness t where the small particles are no longer able to execute an effective cooling function of the target surface 18a; see above. In this position the larger particles 28, 29, 30, 30a, take over the cooling function. The larger particles are able, thanks to their larger mass, to penetrate the thickened layer 23' or the barrier and to take over the cooling function so that cooling can continue at a rapid rate. The cooling function can thus be considered to operate in two phases, wherein the smaller particles provide the primary cooling function in a first phase or an initial phase, and wherein the larger particles take over the cooling sequence in a second phase, which follows the first phase. These two phases are followed by a third phase, during which the attained temperature is maintained.

Figure 2:
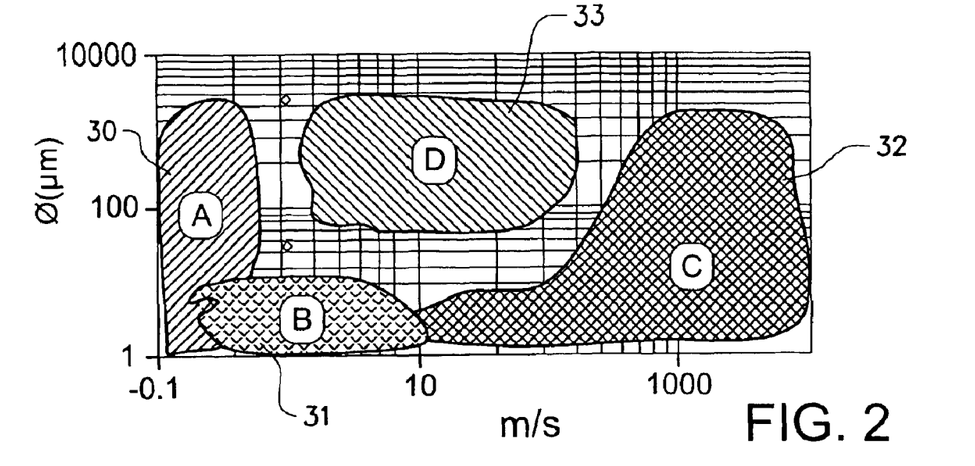
FIG. 2 illustrates in diagrammatic form and in outline various ranges of particle velocities and particle sizes in conjunction with different areas of application for snow, which velocities and sizes are applicable at the moment before the target surface or equivalent is struck.

FIG. 2 contains a diagram showing the sizes and velocities of the dry snow particles used in different applications. This shows a first area 30, which is suitable for use in the food industry to make dry ice, where 31 is an area used in the food industry for cooling and freezing food, and 32 is an area used in the cleaning industry. The designation 33 indicates an area that is outstandingly suitable for use for pest and insect decontamination or vermin decontamination in accordance with the invention. The vertical axis of the diagram indicates the sizes (diameters) of the dry snow particles in micrometers on a logarithmic scale, and the horizontal axis of the diagram similarly shows, also on a logarithmic scale, the velocities in m/s that must be used for the dry snow particles in the various cases. The area 33 lies within the size range of 100 micrometers –2 mm, preferably 50 micrometers –3 mm, and the velocities lie within the range of 1.5–150 m/s, for example 5–100 m/s. It must be noted in this respect that the sizes and velocities identified above are related to the sizes and velocities of the dry snow particles that are present in or adjacent to the area designated by B in FIG. 1.

Figure 3:
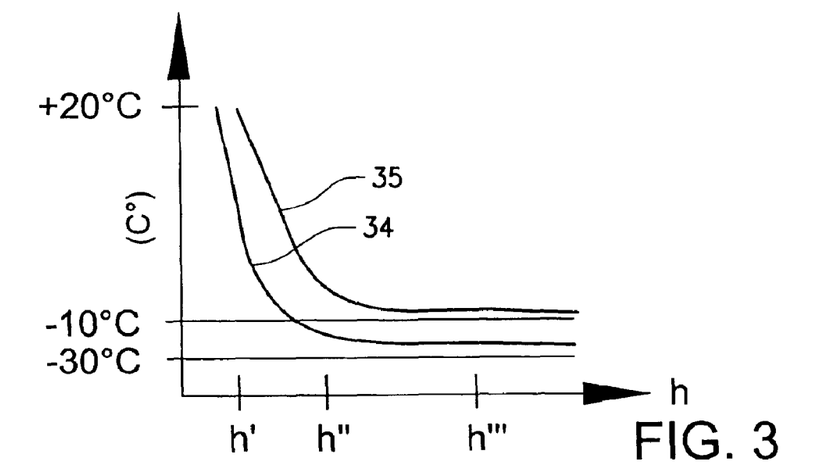
FIG. 3 illustrates in diagrammatic form and in outline curves for the rate of cooling which are appropriate in conjunction with the control of vermin, insects, etc., by direct hits.

In FIG. 3 the vertical axis indicates the temperature T in question and the horizontal axis indicates the time h. The Figure shows an example of a preferred illustrative embodiment where the cooling rate must be 15° C./s. The curve 34 shows an advantageous cooling rate curve, the course of which may be regarded as starting from room temperature, and the desired final cooling temperature may be about –30° C., for example, depending on the type of vermin. This rate of temperature reduction is capable, in the case of a direct hit, of being executed for a period h'–h", which, in the case of a direct hit, can be of the order of about 3 sec. –1 min. The cooling effect or the cooling rate levels out after the time h" and must be maintained for a certain predetermined time h'''–h", for example about 3 sec. or more after h".

The curve 35 illustrates the case where a cooling rate of 2° C./s exists. This is associated with a lowering of the temperature from room temperature to –10° C. The differences indicated in accordance with FIG. 3 may be regarded as being attributable to the case in accordance with the invention, see curve 34, and the case in which the invention with cooling in two phases in accordance with the foregoing is not utilized because the particles do not exhibit the right size or velocity for the initial sublimation and the associated execution of rapid cooling to be achieved, but the small particles are allowed to continue to bombard the built-up layer or barrier 23'; see curve 35. The indicated examples are attributable in the first instance to direct hits or near misses. Shifts in the times are obtained in the case of indirect hits, although these are significantly better than in comparable cases with previously disclosed equipment.

The cooling effect in accordance with the invention is thus influenced by the velocities and sizes of the snow particles. Parameters which can influence the velocities and particle sizes identified above are provided in accordance with the foregoing with different embodiments and variations in length, diameter, geometry, materials, etc. By controlling the velocities and the particle sizes of the snow within the ranges indicated in accordance with the invention, optimal cooling is achieved which meets the principal objective.

In order to optimize cooling, it is possible by means of the invention to ensure that the largest possible mass is sublimated as rapidly as possible as close to the surface as possible, or on the actual surface, which in this way is covered with a layer of rapidly sublimating particles in accordance with the foregoing. Because the energy for the sublimation process is taken for the most part from the surface in question, the cooling produces the intended effective control. The snow buildup effects referred to in the foregoing can be counteracted so that the cooling sequence can be executed in an optimal fashion throughout the entire sublimation process.

In conjunction with testing of the invention, the inventors took high-speed photographs at short intervals and followed the different particles and determined their sizes and velocities as they approached the target surface or equivalent. Temperature measurements were performed in the tests in conjunction with the surface of the target; see FIG. 3. The sizes, velocities, and appearance of the particles could be linked directly in this way to the temperature and thus to the cooling capacity. Different types of appearance of the particles were identified. A very poor cooling capacity was present in slow particles, e.g., particles with velocities below 1.5 m/s. At very high velocities, on the other hand, it is conceivable that the large particles are broken up on impact and that more rapid cooling is achieved. Particle velocities exceeding 150 m/s are not considered to be suitable for a variety of practical reasons, since flour and insects are displaced and undesired scatter and contamination are likely to result. The substrate is also adversely affected by wear, and the personal safety of the decontaminator is reduced. Very small particles, e.g., particles smaller than 0.05 mm in size, have been found not to be capable of practical application in the context indicated in conjunction with the invention, as their useful life is short and the practical decontamination distance is limited. The surface area of very large particles, e.g., larger than 3 mm in size, is too small in relation to the mass to be capable of conducting the energy of the target surface away sufficiently rapidly. Furthermore, these particles are too large to penetrate into cracks and are not acceptable.

The arrangement in accordance with FIG. 1 can be installed in a fixed position in conjunction with a moving conveyor. Alternatively, the arrangement can be executed in a mobile fashion and used in areas and contexts where the nozzle needs to move in relation to the target or the target surface. The equipment 5 and 6 can be fixed or can accompany the nozzle. The conduit 6 can be flexible or movable and can be executed, for example, as a hose or similar.

Figure 4:
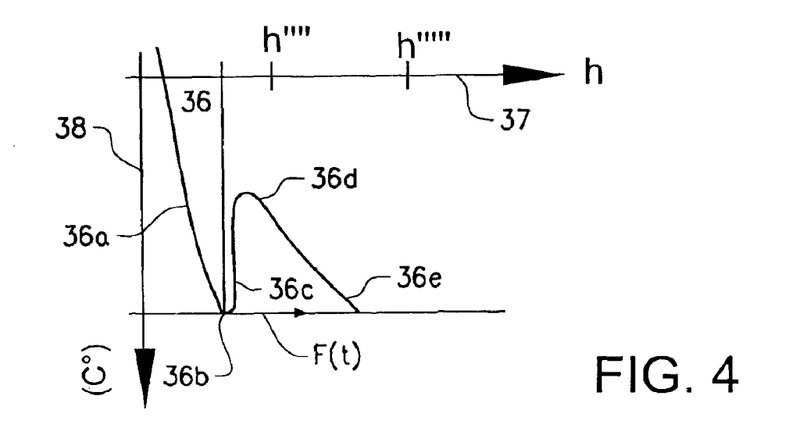
FIGS. 4 and 5 illustrate in diagrammatic form examples of embodiments of curves, where the curves are related to the new and previous cases.

FIG. 4 shows an example of a temperature curve 36 measured for an insect I, I', etc. The horizontal axis 37 represents the time, and the vertical axis 38 represents the temperature. The control measure shown in the foregoing causes cooling to a certain temperature 36b (e.g., −30° C. as described above) to take place along the part 36a of the curve. The insect, or the like, emits a heat response at the temperature 36b which is opposite to the cooling function and gives an upward-facing part 36c of the curve.

At point 36d on the curve, the heat response has reached its maximum value and begins to subside; see point 36e on the curve. According to the invention, the third phase, which is indicated with F(t), must be maintained until the maximum has been passed; i.e., until the time when point 36e on the curve begins. The first adopted temperature occurs at h"", and the time for completion of the third phase is indicated by h""; see also times h" and h'" in FIG. 3.

Figure 5:
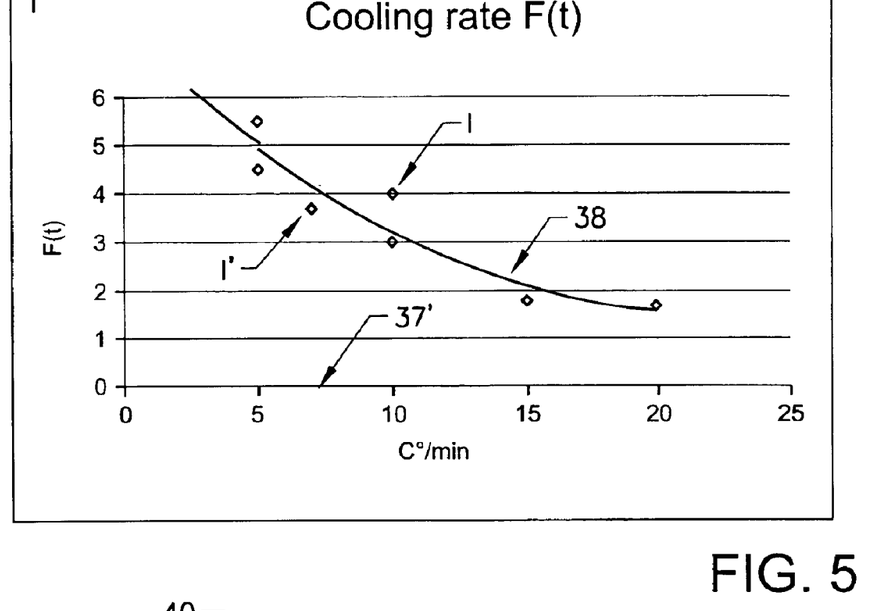

The cooling rate after the critical temperature 36b in FIG. 4 is shown in FIG. 5. The horizontal axis 37' in FIG. 5 indicates degrees/min, and the vertical axis 38' shows F(t)= time. The curve 39 shows the cooling rate as a function of F(t). In FIGS. 4 and 5, F(t) thus indicates the time for which the critical temperature 36b must be maintained in order to be certain that killing has reliably occurred. In spite of the low temperature reduction rates in accordance with the Figures, the effects are excellent in the case of direct hits on the insect (vermin) in question.

Figure 6:
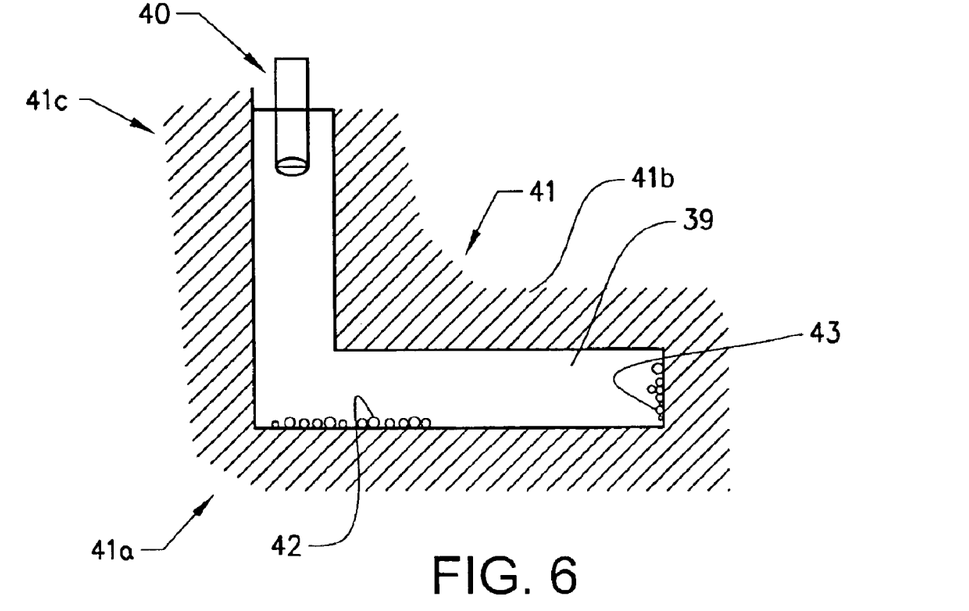
FIG. 6 illustrates a difficult control case in side view and in outline.

The designation 40a in FIG. 6 is used to denote an inaccessible control point, which is capable of being controlled effectively with the equipment 40 in accordance with the invention, indicated symbolically in FIG. 6. The object in question, which includes the area 40a, is indicated by the designation 41, and the area 40a is situated after a bend 41a, via which a part 41b including the area 40a turns off, for example perpendicular to a part 41c, via which the equipment 40 is capable of activation or application.

The part 41b can harbor dust, mold, impurities, 42, etc., which can make control with previously disclosed methods and arrangements more difficult. Absolute killing of inaccessibly situated vermin 43 can be achieved with the invention, which should be capable of counteracting or eliminating the development of resistance in the vermin. In one and the same nozzle, the emerging snow particles exhibit the same discharge velocity as a rule.

Very small particles disappear or are agglomerated during movement over the distance A (see FIG. 1). The particles normally reduce in size and velocity during that movement. Where the distance A is small, the discharge velocity is selected to be comparatively small, and vice versa. As far as the size of the particles is concerned, they can be distributed between minimum and maximum, in conjunction with which different size ranges can be attributed, respectively, as small/quite small and large/quite large. In principle, it is possible to imagine that snow particles of a medium size do not participate in the cooling process.

The invention is not restricted to the illustrative embodiment shown above by way of example, but may be subjected to modifications within the scope of the following claims and the idea of the invention.

What is claimed is:

1. A method of controlling vermin, said method comprising the steps of:
   a) forming a plurality of first snow particles having first particle sizes and first particle masses;
   b) forming a plurality of second snow particles having second particle sizes and second particle masses that are larger than those of the first snow particles;
   c) directing the first snow particles toward vermin to be controlled, whereby the first snow particles have a first mass and a first velocity, wherein the first snow particles attach to the surface of the vermin and sublime adjacent to the vermin surface to cool the vermin and to form a gaseous layer adjacent surfaces of the vermin;
   d) directing the second snow particles toward the vermin, whereby the second snow particles have a second mass and a second velocity sufficient to enable the second snow particles to penetrate the gaseous layer and to maintain the vermin at a cool temperature for a time sufficient to kill the vermin.

2. A method in accordance with claim 1, wherein the first and second particle velocities are determined as a function of a distance between a nozzle from which the particles issue and the vermin.

3. A method in accordance with claim 1, wherein rapid cooling is attained by operating with two cooling sequences, whereby in a first cooling sequence the first snow particles execute a primary cooling step, and in a second cooling sequence following the first cooling sequence the second snow particles continue to execute the primary rapid cooling step.

4. A method in accordance with claim 1, wherein the snow particles are generated in a nozzle arrangement and are carbon dioxide snow.

5. A method in accordance with claim 1, wherein the snow particles are formed utilizing a pressurized gas, and the pressurized gas is a non-toxic gas.

6. A method in accordance with claim 1, wherein the particle sizes and particle velocities of the snow particles upon contacting the vermin provide a cooling rate within a range of 3–30° C./s.

7. A method in accordance with claim 1, wherein the first snow particles and the second snow particles are directed toward the vermin at different velocities and the different particle sizes and different velocities of the snow particles are achieved by adjustment of a form of a flow channel in a nozzle arrangement.

8. A method in accordance with claim 1, wherein the sizes and velocities of the snow particles provide a desired cooling effect with regard to the effectiveness of vermin control measures.

9. A method in accordance with claim 1, wherein sublimation takes place adjacent to the vermin, and wherein the vermin rapidly receive at least a partial covering layer of rapidly sublimating snow particles.

10. A method in accordance with claim 9, wherein energy necessary for the sublimation is transferred from the vermin to the snow particles to subject the vermin to rapid cooling.

11. A method in accordance with claim 1, wherein the first and second snow particles collide with the vermin for providing more rapid cooling.

12. A method in accordance with claim 1, wherein the snow particles are generated in a nozzle and the nozzle is operated to bring about a pulsed flow of the first and second snow particles.

13. A method in accordance with claim 1, wherein the snow particles are generated in a nozzle and the nozzle is operated to provide different particle sizes and different particle velocities of the first and second snow particles during different time periods.

14. A method in accordance with claim 1, wherein the particle sizes are within a range between 100 micrometers–2 mm at a distance from the vermin of about 0.5 cm, and the particles are directed toward the vermin within a velocity range between 1.5–150 m/s.

15. A method in accordance with claim 1, wherein the snow particles are generated in a nozzle and a distance between the vermin and the nozzle is within the range of 5–50 cm.

16. A method in accordance with claim 1, including the step of maintaining a low temperature for a time period which is selected as a function of characteristics of the controlled vermin.

17. A method in accordance with claim 16, wherein the time period exceeds a period in which an opposing heat response executed by the vermin takes place.

18. A method in accordance with claim 17, wherein the time period is selected to exceed a period after the heat response reaches a maximum value.

19. A method in accordance with claim 1, including at least two nozzles which generate different discharge velocities for the snow particles.

20. A method in accordance with claim 1, wherein the snow particles are generated in a nozzle and snow particles of different sizes and different velocities generated in the nozzle are used essentially unassisted to execute vermin control measures in a rapid cooling sequence.

21. A method in accordance with claim 20, wherein smaller snow particles bring about a first phase of a cooling sequence, and larger snow particles bring about a second phase of the cooling sequence following the first phase.

22. A method in accordance with claim 1, wherein the first and second snow particles are formed together as a plurality of snow particles having different particle sizes and different particle masses, and wherein the plurality of snow particles are together directed toward the vermin to be controlled.

* * * * *